United States Patent
Stählin

(10) Patent No.: US 10,907,975 B2
(45) Date of Patent: Feb. 2, 2021

(54) APPARATUS FOR PRODUCING A DIGITAL TOPOGRAPHICAL POSITION MAP IN A VEHICLE

(71) Applicant: Continental Teves AG & Co. oHG, Frankfurt (DE)

(72) Inventor: Ulrich Stählin, Oakland Township, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 292 days.

(21) Appl. No.: 15/938,717

(22) Filed: Mar. 28, 2018

(65) Prior Publication Data
US 2018/0216945 A1  Aug. 2, 2018

Related U.S. Application Data

(63) Continuation of application No. PCT/EP2016/072314, filed on Sep. 6, 2016.

(30) Foreign Application Priority Data

Sep. 29, 2015 (DE) .......... 10 2015 218 811

(51) Int. Cl.
*G01C 21/32* (2006.01)
*G06F 16/29* (2019.01)
(Continued)

(52) U.S. Cl.
CPC .............. *G01C 21/32* (2013.01); *G01S 19/42* (2013.01); *G06F 16/29* (2019.01); *G09B 29/106* (2013.01); *H04W 4/023* (2013.01); *G06F 17/18* (2013.01)

(58) Field of Classification Search
CPC ......... G01C 21/32; G06F 16/29; G06F 17/18; G01S 19/42; G09B 29/106; H04W 4/023
(Continued)

(56) References Cited

U.S. PATENT DOCUMENTS

| 8,686,900 B2 * | 4/2014 | Whitehead ............. G01S 19/51 342/357.27 |
| 2009/0271112 A1 * | 10/2009 | Basnayake ............ G01S 5/0072 701/469 |

(Continued)

FOREIGN PATENT DOCUMENTS

| CN | 1842692 A | 10/2006 |
| CN | 101290725 A | 10/2008 |

(Continued)

OTHER PUBLICATIONS

P. Sahlholm, et al, Road Grade Estimation for Look-Ahead Vehicle Control Using Multiple Measurement Runs, Control Engineering Practice, 2010, vol. 18, S. 1328-1341.
(Continued)

*Primary Examiner* — Jonathan M Dager
*Assistant Examiner* — Jean W Charleston

(57) ABSTRACT

An apparatus for producing a digital topographical position map in a vehicle comprises a receiver for receiving sensor data that specify different topographical positions of the vehicle, a processor that is designed to take the different topographical positions of the vehicle as a basis for sensing an average topographical position of the vehicle and at least one further topographical position of the vehicle, which differs from the average topographical position, wherein the processor is designed to produce the digital topographical position map on the basis of the average topographical position, and to store the at least one further topographical position in the digital topographical position map.

13 Claims, 3 Drawing Sheets

(51) Int. Cl.
*G01S 19/42* (2010.01)
*G09B 29/10* (2006.01)
*H04W 4/02* (2018.01)
*G06F 17/18* (2006.01)

(58) Field of Classification Search
USPC .......................................................... 701/45
See application file for complete search history.

(56) References Cited

U.S. PATENT DOCUMENTS

| | | | | |
|---|---|---|---|---|
| 2014/0025292 | A1* | 1/2014 | Stahlin | G08G 1/0129 701/461 |
| 2015/0099533 | A1* | 4/2015 | Menouar | G01S 5/0072 455/456.1 |
| 2016/0138933 | A1* | 5/2016 | Yamaguchi | G01C 21/3691 701/532 |
| 2017/0131409 | A1* | 5/2017 | Irish | G01S 19/42 |

FOREIGN PATENT DOCUMENTS

| | | |
|---|---|---|
| CN | 102736090 A | 10/2012 |
| CN | 104036246 A | 9/2014 |
| CN | 104916133 A | 9/2015 |
| DE | 10030932 A1 | 1/2002 |
| DE | 102008012697 A1 | 1/2002 |
| DE | 102009017731 A1 | 1/2002 |
| DE | 102013211800 A1 | 1/2002 |
| JP | 2008267875 A | 11/2008 |
| JP | 2010509585 A | 3/2010 |
| JP | 2012520490 A | 9/2012 |
| WO | 2014196633 A1 | 12/2014 |

OTHER PUBLICATIONS

International Search Report and Written Opinion dated Dec. 5, 2015 from corresponding International Patent Application No. PCT/EP2016/072314.

German Office Action dated Jul. 3, 2017 for corresponding German Patent Application No. PCT/EP2016/072314.

Chinese Office Action dated Jul. 1, 2020 for the counterpart Chinese Invention Application No. 201680033799.1.

Japanese Notice of Reasons for Refusal dated Aug. 24, 2020 for the counterpart Japanese Patent Application No. 2018-501903.

\* cited by examiner

APPARATUS FOR PRODUCING A DIGITAL TOPOGRAPHICAL POSITION MAP IN A VEHICLE

CROSS REFERENCE TO RELATED APPLICATION

This U.S. patent application claims the benefit of PCT patent application No. PCT/DE2016/072314, filed Sep. 6, 2016, which claims the benefit of German patent application No. 10 2015 218 811.6, filed Sep. 29, 2015, both of which are hereby incorporated by reference.

TECHNICAL FIELD

The present invention relates to the field of digital maps, in particular, for producing a position map in a vehicle.

BACKGROUND

Self-learning digital maps are already being used in the field of mobile robotics and motor vehicles. During the production of self-learning maps, map data are typically produced on the basis of sensed sensor information, for example a position, a speed, an acceleration, or on the basis of data from environment sensors and are stored for subsequent use. In the process, an attempt is made to establish the most likely representation of the surroundings from the plurality of sensor data and to store this in the digital map. However, if the sensor data contain considerable uncertainties, it is difficult to produce a precise self-learning digital map.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect, an apparatus for producing a digital topographical position map in a vehicle comprises a receiver for receiving sensor data that specify different topographical positions of the vehicle, a processor that is designed to take the different topographical positions of the vehicle as a basis for sensing an average topographical position of the vehicle and at least one further topographical position of the vehicle, which differs from the average topographical position, wherein the processor is designed to produce the digital topographical position map on the basis of the average topographical position, and to store the at least one further topographical position in the digital topographical position map. The average topographical position may be a position of the vehicle at a coordinate of the position map (hereinafter shortened to the average topographical position). As a result, a digital topographical position map may be efficiently produced on the basis of the sensor data. In addition to the sensed average topographical position of the vehicle, further topographical positions may be stored in this position map, wherein the further topographical positions are also based on topographical positions of the vehicle and may comprise additional information regarding the handling of the vehicle or the vehicle surroundings.

The vehicle may be a motor vehicle, in particular a passenger car, a truck, an automobile, a motorcycle, an electric motor vehicle or a hybrid motor vehicle, such as a hybrid vehicle.

The receiver may be a V2X receiver or a BUS receiver. The receiver may be designed to receive the sensor data with a BUS communication network or a V2X communication network. The receiver may further comprise a communication interface, in particular a V2X communication interface or a BUS communication interface.

The sensor data may comprise GNSS position data of a GNSS sensor. The GNSS sensor may be arranged in the vehicle and may be connected to the BUS communication network in the vehicle.

According to one embodiment, the processor is designed to sense a distribution, in particular a normal distribution, of the different topographical positions of the vehicle, and to take the distribution as a basis for sensing the average topographical position as an average of the distribution and the at least one further topographical position as a limit of the distribution. As a result, the topographical position map may be produced on the basis of the average and, simultaneously, a deviation of the average may be noted in the position map. A conclusion regarding a characteristic of the vehicle surroundings, for example a number of lanes of a road, may be drawn from the deviation of the average.

According to another embodiment, the processor is designed to sense the limit at a fixed distance from the average. As a result, in the case of a known distribution of the different topographical positions, a suitable limit for the distribution may be stored in the topographical position map.

According to another embodiment, the at least one further topographical position comprises a first limit and/or a second limit, wherein the processor is designed to sense the first limit and/or the second limit as a standard deviation or as a multiple of the standard deviation of the average of the distribution. As a result, the first limit and the second limit may be sensed as a measure of a breadth of the distribution and may be stored in the digital topographical position map.

The further topographical positions may consequently be sensed as a measure of an inaccuracy or fluctuation of the sensor data and may be stored as limits in the topographical position map. Conclusions may be drawn from this inaccuracy or fluctuation of the sensor data, for example, regarding the vehicle surroundings, for instance the number of lanes of a road.

If the distribution is a normal distribution with the standard deviation σ about the average, the further topographical positions may comprise the limits ±1σ, ±2σ, ±3σ, ±4σ, or ±5σ about the average.

According to another embodiment, the at least one further topographical position comprises a first limit and/or a second limit, wherein the processor is designed to sense the first limit and/or the second limit at such a distance from the average that the first limit delimits a first percentile and the second limit delimits a second percentile of the distribution. As a result, the first limit and the second limit may be sensed as a measure of a breadth of the distribution and may be stored in the digital topographical position map.

The first percentile and the second percentile may, for example, be 10% and 90%, 5% and 95%, or 1% and 99% of the sensed topographical positions.

According to another embodiment, the processor is designed not to store the at least one further topographical position in the digital topographical position map, if the distance between the at least one further topographical position and the average topographical position falls below a threshold value. As a result, the digital topographical position map may be efficiently produced on the basis of the average topographical position. In the event of a small distribution of the sensed topographical positions due to a small fluctuation of the sensor data and/or a small measuring error of the sensor data, the storing of further topographical positions may be dispensed with.

According to another embodiment, the processor is designed to store a sensing time of the at least one further topographical position in the digital topographical position map. As a result, fluctuations to different degrees of the topographical position may be efficiently sensed at different times of the day or on different days of the week and may be stored in the position map.

According to another embodiment, the processor is designed to sense the average topographical position and/or the at least one further topographical position on the basis of the received sensor data and the topographical positions already stored in the digital topographical position map. As a result, the topographical position map may be a self-learned or respectively self-learning digital map, which may be continuously extended or respectively supplemented on the basis of newly sensed sensor data.

According to another embodiment, the sensor data comprise position coordinates of the vehicle in a plane and/or position coordinates of the vehicle vertical to the plane. As a result, the digital topographical position map may be efficiently produced on the basis of position coordinates of the vehicle. The average topographical position may, for example, be an average height of the vehicle above a position coordinate in the plane and the further topographical position may be a minimum or maximum deviation of the average height.

According to another embodiment, the receiver is designed to receive further sensor data, wherein the further sensor data comprise driving data, in particular speed data of the vehicle, and/or surroundings data, in particular an inclination of the roadway, at a topographical position of the vehicle. As a result, the digital topographical position map may be efficiently supplemented with the further sensor data. On the basis of the further sensor data, additional information, for example a condition of the roadway or an anticipated driving time, may be established and made available to a user of the topographical position map.

According to another embodiment, the processor is designed to take the further sensor data as a basis for sensing an average sensor value and at least one further sensor value, which differs from the average sensor value, and to store the average sensor value and the at least one further sensor value in the digital topographical position map at the appropriate topographical position. As a result, the digital topographical position map may be efficiently supplemented with the further sensor data.

A most likely representation of the further sensor data may be stored in the digital topographical position map with the average sensor value. Additional information regarding a distribution and/or inaccuracy of the further sensor data may, furthermore, be stored in the digital topographical position map with the further sensor value. The average sensor value and the at least one further sensor value may comprise an average speed and a minimum or maximum speed, or an average inclination of the roadway and a minimum or maximum inclination of the roadway.

According to another embodiment, the processor is designed to sense a distribution, in particular a normal distribution, of the further sensor data, and to take the distribution of the further sensor data as a basis for sensing the average sensor value as an average of the distribution of the further sensor data and the at least one further sensor value as a limit of the distribution of the further sensor data. As a result, the further sensor data may be represented as accurately as possible on the basis of the average of the distribution and, simultaneously, a measure of the deviation of the average of the distribution may be sensed and noted in the digital topographical position map.

According to another embodiment, the processor is designed to sense the limit of the distribution of the further sensor data at a fixed distance from the average of the distribution of the further sensor data. As a result, in the case of a known distribution of the further sensor data, a suitable limit for the distribution of the further sensor data may be stored in the topographical position map.

According to another embodiment, the at least one further sensor value comprises a first limit of the distribution of the further sensor data and/or a second limit of the distribution of the further sensor data, wherein the processor is designed to sense the first limit of the distribution of the further sensor data and/or the second limit of the distribution of the further sensor data as a standard deviation or as a multiple of the standard deviation of the average of the distribution of the further sensor data. As a result, the first limit and the second limit of the distribution of the further sensor data may be sensed as a measure of a breadth of the distribution of the further sensor data and may be stored in the digital topographical position map.

According to another embodiment, the at least one further sensor value comprises a first limit of the distribution of the further sensor data and/or a second limit of the distribution of the further sensor data, wherein the processor is designed to sense the first limit and/or the second limit of the distribution of the further sensor data at such a distance from the average of the distribution of the further sensor data that the first limit of the distribution of the further sensor data delimits a first percentile and the second limit of the distribution of the further sensor data delimits a second percentile about the average of the distribution of the further sensor data. As a result, the first limit and the second limit of the distribution of the further sensor data may be sensed as a measure of a breadth of the distribution of the further sensor data and may be stored in the digital topographical position map.

According to another embodiment, the processor is designed not to store the at least one further sensor value in the digital topographical position map, if the difference between the at least one further sensor value and the average sensor value falls below a further threshold value. As a result, the further sensor data may be efficiently stored in the digital topographical position map. In the event of a small distribution of the further sensor data due to an accurate measurement and/or a small measuring error, the storing of further sensor values in the digital topographical position map may be dispensed with.

According to another embodiment, the processor is designed to store a sensing time of the at least one further sensor value in the digital topographical position map. As a result, fluctuations of the at least one further sensor value at different times of the day or on different days of the week may be efficiently sensed and stored in the digital topographical position map.

According to another embodiment, the apparatus comprises a memory, wherein the processor is designed to store the digital topographical position map in the memory. As a result, the digital topographical position map may be stored for subsequent use in the vehicle.

According to a second aspect, a method for producing a digital topographical position map in a vehicle, comprises the steps of: receiving sensor data that specify different topographical positions of the vehicle, sensing an average topographical position of the vehicle and at least one further topographical position of the vehicle, which differs from the average topographical position, on the basis of the sensor data, producing the digital topographical position map on the basis of the average topographical position, and storing the further topographical position in the digital topographical position map. As a result, the digital topographical position map may be efficiently produced on the basis of the sensor data.

According to a third aspect, a method for storing further sensor data in a digital topographical position map in a vehicle, comprises the steps of: receiving the further sensor data, wherein the further sensor data comprise driving data, in particular speed data of the vehicle, or surroundings data, in particular an inclination of the roadway, at a topographical position of the vehicle, sensing an average sensor value and at least one further sensor value, which differs from the average sensor value on the basis of the further sensor data, and storing the average sensor value and the at least one further sensor value in the digital topographical position map at the appropriate topographical position. As a result, the digital topographical position map may be efficiently supplemented with the further sensor values.

According to a fourth aspect, a computer program comprises programming code for executing the method according to the second aspect and/or the method according to the third aspect, if the programming code is run on a computer.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE FIGURES

Further embodiment examples will be explained in greater detail with reference to the attached figures, wherein.

DETAILED DESCRIPTION

Figure 1:
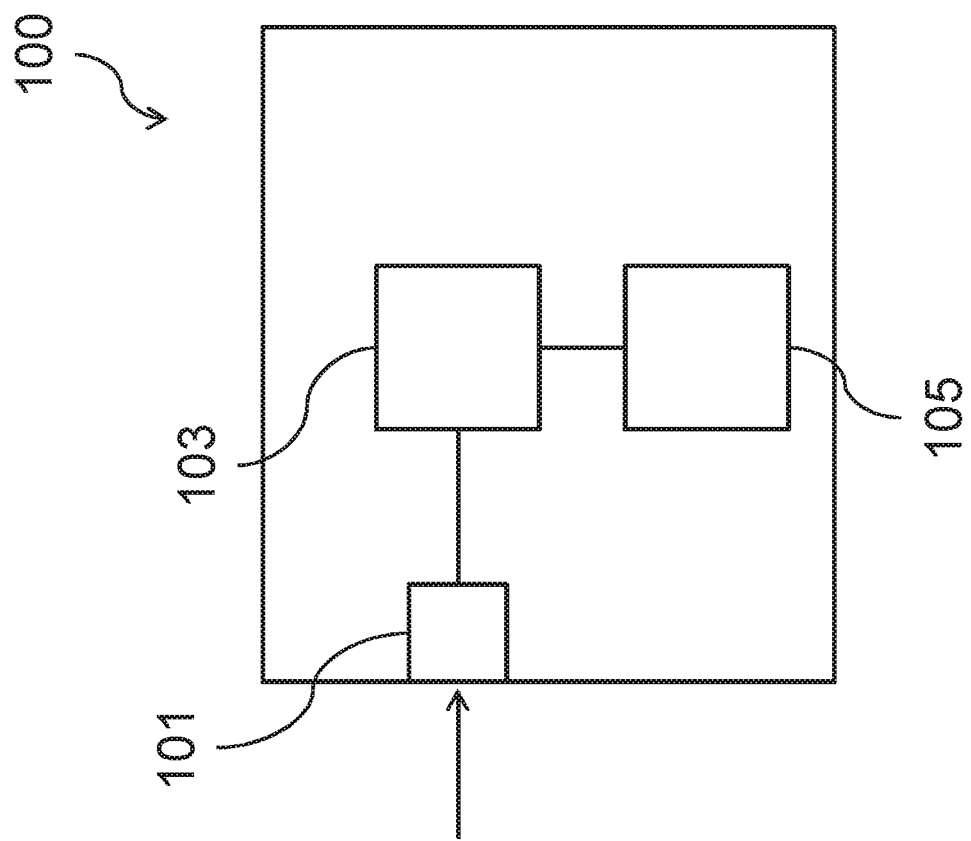
FIG. 1 shows a schematic representation of an apparatus for producing a digital topographical position map in a vehicle.

FIG. 1 shows an apparatus 100 for producing a digital topographical position map in a vehicle according to one embodiment.

The apparatus 100 for producing the digital topographical position map in the vehicle comprises a receiver 101 for receiving sensor data that specify different topographical positions of the vehicle, and a processor 103 that is designed to take the different topographical positions of the vehicle as a basis for sensing an average topographical position of the vehicle and at least one further topographical position of the vehicle, which differs from the average topographical position, wherein the processor 103 is designed to produce the digital topographical position map on the basis of the average topographical position, and to store the at least one further topographical position in the digital topographical position map.

The vehicle may be a motor vehicle, in particular a passenger car, a truck, an automobile, a motorcycle, an electric motor vehicle or a hybrid motor vehicle, such as a hybrid vehicle.

The receiver 101 may be a V2X receiver or a BUS receiver. The receiver 101 may be designed to receive the sensor data with a BUS communication network or a V2X communication network. The receiver 101 may further comprise a communication interface, in particular a V2X communication interface or a BUS communication interface.

The sensor data may comprise GNSS position data of a GNSS sensor. The GNSS sensor may be arranged in the vehicle and may be connected to the BUS communication network in the vehicle or may be part of the apparatus 100. Furthermore, the sensor data may comprise position coordinates of the vehicle in a plane and/or position coordinates at a height vertical to the plane.

The apparatus 100 in FIG. 1 may further comprise a memory 105.

The processor 103 may be connected by means of communication technology to the receiver 101 and the memory 105.

The processor 103 may be designed to store the produced digital topographical position map in the memory 105.

The receiver 101 may be designed to receive further sensor data. The further sensor data may comprise driving data, for example a speed of the vehicle, and/or surroundings data, for example a gradient or inclination of the roadway. These driving or respectively surroundings data may be received at a topographical position and assigned by the processor 103 to this topographical position.

The further sensor data may be sensed by further sensors in or on the vehicle. These further sensors may be speed sensors or surroundings or respectively environment sensors, for example optical distance sensors. The processor 103 may furthermore be designed to establish the driving and/or surroundings data on the basis of the sensor data and/or the further sensor data. For example, the processor 103 may be designed to establish a gradient or respectively inclination of the roadway from a change in the position in the plane and the position vertical to the plane.

The further sensor data may furthermore comprise image data or surroundings parameters established from image data at a topographical position of the vehicle.

The processor 103 may be designed to take the further sensor data as a basis for sensing an average sensor value and at least one further sensor value, wherein the further sensor value differs from the average sensor value.

The average topographical position may be an average of a distribution, in particular of a normal distribution, of the topographical positions sensed by the receiver 101. The at least one further topographical position may be a bound or respectively a limit or a plurality of limits of the distribution of the further sensor data.

The average sensor value may be an average of a distribution, in particular of a normal distribution, of the further sensor data sensed by the receiver 101. The further sensor value may be a bound or respectively a limit or a plurality of limits of the distribution.

The processor 103 may be designed to sense the further topographical position and/or the further sensor value at a fixed distance from the average topographical position or respectively from the average sensor value.

Furthermore, the processor 103 may be designed to sense the further topographical position and/or the further sensor value as bounds or respectively limits of the distribution of the topographical positions or respectively the distribution of the further sensor data. The further topographical positions or respectively the further sensor values may, in this case, delimit a standard deviation about the average topographical position or respectively the average sensor value. Furthermore, the further topographical positions or respectively the further sensor values may delimit percentiles of the distribution of the different topographical positions or respectively the further sensor values.

According to one embodiment, the processor 103 may be designed to store the further topographical position in the digital topographical position map if the distance between the further topographical position and the average topographical position exceeds a threshold value, and not to store the further topographical position in the digital topographical position map if the distance between the further topographical position and the average topographical position falls below the threshold value.

The processor 103 may furthermore be designed to store the further sensor value in the digital topographical position map if the difference between the further sensor value and the average sensor value exceeds a further threshold value, and not to store the further sensor value in the digital topographical position map if the difference between the further sensor value and the average sensor value falls below the further threshold value.

According to a further embodiment, the processor 103 may be designed to make a note in the digital topographical position map, if the further topographical position or the further sensor value are not stored in the position map.

According to a further embodiment, the processor 103 may be designed to store a sensing time, in particular a time of day and/or a day of the week, of the average topographical position or respectively of the average sensor value and/or the further topographical position or respectively the further sensor value in the digital topographical position map. Furthermore, the processor 103 may be designed to store the further topographical positions and the further sensor values for different sensing times in the digital topographical position map. If the further sensor data are, for example, speed data, the processor 103 may be designed to establish, on the basis of the sensing time, a traffic flow dependent on the time of day or an arrival time to be expected on a route.

According to a further embodiment, the further topographical position and/or the further sensor value may be stored as map data in the digital topographical position map.

According to a further embodiment, applications, for example, software or applications which evaluate the map data of the digital topographical position map, may be made possible or respectively facilitated by means of the storing of the further sensor value or the further topographical position, a more precise evaluation and/or a correlation of the topographical positions and the further sensor data.

For example, position information of GNSS sensors at the height vertical to the plane are typically significantly more inaccurate than position information in the plane. Therefore, a maximum and a minimum height may additionally be stored in the digital topographical position map for each learned edge, or respectively position in the plane, wherein the maximum and minimum heights correspond to further topographical positions. The maximum and minimum heights may, for example, be the first limit and the second limit of a distribution of the position coordinates vertical to the plane. It is thus possible, for example, to identify whether two roads which intersect on the digital topographical position map form a crossroads, or whether one of the roads runs over or respectively under the other road in the form of a bridge or an underpass. It is frequently not possible to distinguish between a crossroads, bridge and underpass solely on the basis of the average topographical positions, since these cannot always be sensed accurately enough.

According to one embodiment, the same algorithms may be used to sense or respectively learn the minimum and maximum values, or respectively the limits of the distribution, which algorithms are also used to create the digital topographical position map on the basis of the average topographical position.

According to a further embodiment, the digital topographical position map may be a self-learning or respectively a self-learned digital map.

According to a further embodiment, the apparatus 100 may comprise a transmitter, in particular a V2X transmitter, wherein the transmitter may be designed to emit the sensor data and/or the further sensor data and/or the digital topographical position map.

Figure 2:
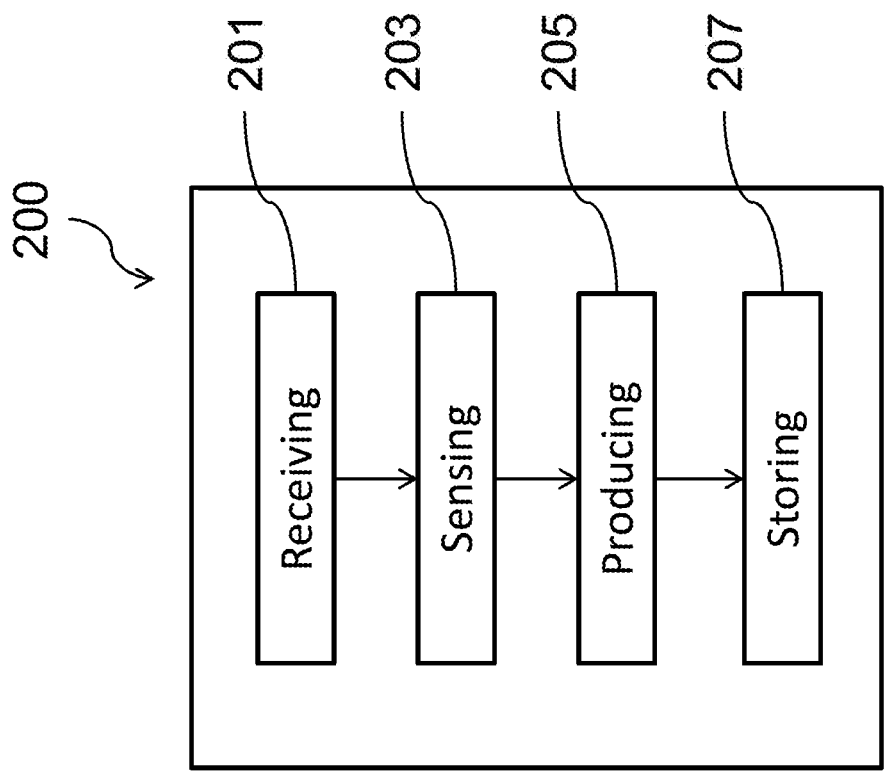
FIG. 2 shows a diagram of a method for producing a digital topographical position map in a vehicle.

FIG. 2 shows a diagram of a method 200 for producing the digital topographical position map.

The method 200 for producing the digital topographical position map comprises the receiving 201 of sensor data that specify different topographical positions of the vehicle, the sensing 203 of an average topographical position of the vehicle and at least one further topographical position of the vehicle, which differs from the average position on the basis of the sensor data, the producing 205 of the digital topographical position map on the basis of the average topographical position, and the storing 207 of the further topographical position in the digital topographical position map.

Figure 3:
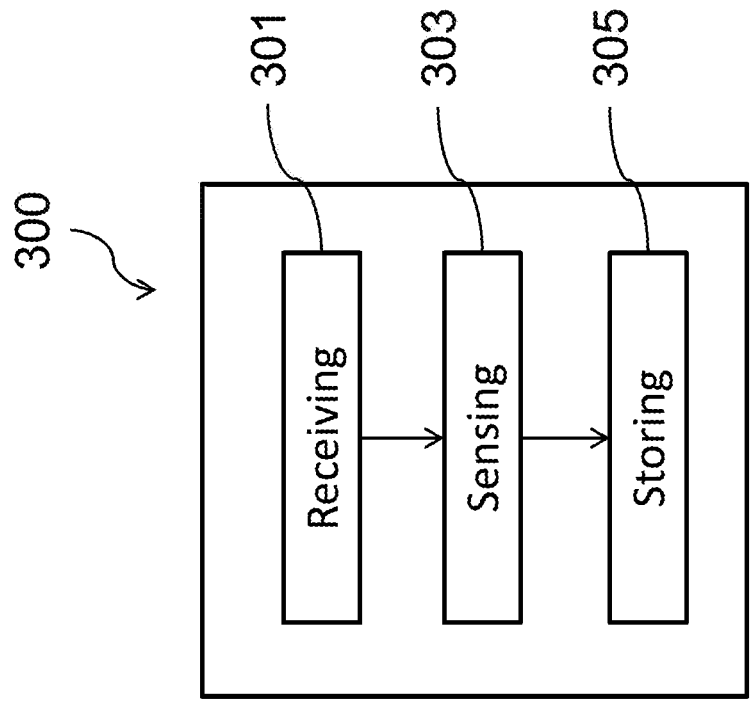
FIG. 3 shows a diagram of a method for storing further sensor data in a digital topographical position map.

FIG. 3 shows a diagram of a method 300 for storing further sensor data in the digital topographical position map in the vehicle.

The method 300 for storing further sensor data in the digital topographical position map in the vehicle comprises the receiving 301 of the further sensor data, wherein the further sensor data comprise driving data, in particular speed data of the vehicle, or surroundings data, in particular an inclination of the roadway, at a topographical position of the vehicle, the sensing 303 of an average sensor value and at least one further sensor value, which differs from the average sensor value, on the basis of the further sensor data; and the storing 305 of the average sensor value and of the at least one further sensor value in the digital topographical position map at the appropriate topographical position.

According to one embodiment, the apparatus 100 may be designed to perform the method 200 for producing the digital topographical position map and the method 300 for storing further sensor data in the digital topographical position map in a simultaneous or alternating manner.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. An apparatus for producing a digital topographical position map in a vehicle comprising:
   a GNSS sensor designed to sense sensor data, wherein the sensor data comprise GNSS position data;
   a further sensor designed to sense further sensor data, wherein the further sensor data includes at least speed data of the vehicle;
   a receiver for receiving the sensor data and the further sensor data, wherein the sensor data specify different topographical positions of the vehicle;
   a processor that to take the different topographical positions of the vehicle as a basis for sensing an average topographical position of the vehicle and at least one further topographical position of the vehicle, which differs from the average topographical position; and
   wherein the processor is designed to produce the digital topographical position map on the basis of the average topographical position, to store the at least one further topographical position in the digital topographical position map, and to supplement the digital topographical position map with the further sensor data.

2. The apparatus according to claim 1, wherein the processor is designed to sense a distribution of the different topographical positions of the vehicle, and to take the distribution as a basis for sensing the average topographical position as an average of the distribution and the at least one further topographical position as a limit of the distribution.

3. The apparatus according to claim 2, wherein the processor is designed to sense the limit at a fixed distance from the average.

4. The apparatus according to claim 2, wherein the at least one further topographical position comprises a first limit and a second limit, wherein the processor is designed to sense the first limit and the second limit as a standard deviation or as a multiple of the standard deviation of the average of the distribution.

5. The apparatus according to claim 2, wherein the at least one further topographical position comprises a first limit and a second limit, wherein the processor is designed to sense the first limit and the second limit at such a distance from the average that the first limit delimits a first percentile and the second limit delimits a second percentile of the distribution.

6. The apparatus according to claim 1, wherein the processor is designed not to store the at least one further topographical position in the digital topographical position map, if the distance between the at least one further topographical position and the average topographical position falls below a threshold value.

7. The apparatus according to claim 1, wherein the processor is designed to store a sensing time of the at least one further topographical position in the digital topographical position map.

8. The apparatus according to claim 1, wherein the processor is designed to sense the average topographical position and the at least one further topographical position on the basis of the received sensor data and the topographical positions already stored in the digital topographical position map.

9. The apparatus according to claim 1, wherein the sensor data comprise position coordinates of the vehicle in a plane and position coordinates of the vehicle vertical to the plane.

10. The apparatus according to claim 1, wherein the processor is designed to take the further sensor data as a basis for sensing an average sensor value and at least one further sensor value, which differs from the average sensor value, and to store the average sensor value and the at least one further sensor value in the digital topographical position map at the appropriate topographical position.

11. The apparatus according to claim 1, wherein the apparatus comprises a memory, and wherein the processor is designed to store the digital topographical position map in the memory.

12. A method for producing a digital topographical position map in a vehicle, comprising:
    sensing sensor data, wherein the sensor data comprise GNSS position data;
    sensing further sensor data, wherein the further sensor data comprise speed data of the vehicle;
    receiving the sensor data and the further sensor data, wherein the sensor data specify different topographical positions of the vehicle;
    sensing an average topographical position of the vehicle and at least one further topographical position of the vehicle, which differs from the average topographical position, on the basis of the sensor data;
    producing the digital topographical position map on the basis of the average topographical position;
    storing the further topographical position in the digital topographical position map; and
    supplementing the digital topographical position map with the further sensor data.

13. A method for storing further sensor data in a digital topographical position map in a vehicle comprising:
    receiving the further sensor data, wherein the further sensor data comprise at atleast one of driving data, speed data of the vehicle, surroundings data, or an inclination of the roadway, at a topographical position of the vehicle;
    sensing an average sensor value and at least one further sensor value, which differs from the average sensor value, on the basis of the further sensor data; and
    storing the average sensor value and the at least one further sensor value in the digital topographical position map at the appropriate topographical position.

* * * * *